United States Patent [19]

Kobayashi

[11] 4,434,990
[45] Mar. 6, 1984

[54] FLUID-ACTUATED HOLLOW POWER CHUCK

[75] Inventor: Takeo Kobayashi, Nagoya, Japan

[73] Assignee: Howa Kogyo Kabushiki Kaisha, Nagoya, Japan

[21] Appl. No.: 322,251

[22] Filed: Nov. 17, 1981

[30] Foreign Application Priority Data

Nov. 26, 1980 [JP] Japan ............................ 55-166131

[51] Int. Cl.³ .......................... B23B 31/30; B23B 5/34
[52] U.S. Cl. ............................................ 279/4; 279/123
[58] Field of Search .................... 279/4, 121, 111, 123

[56] References Cited

U.S. PATENT DOCUMENTS

| 3,516,680 | 6/1970 | Andre | 279/4 |
| 3,771,803 | 11/1973 | Hiestand | 279/4 |
| 3,918,352 | 11/1975 | Reich | 279/4 |
| 3,972,537 | 8/1976 | McClelland | 279/4 |
| 3,986,437 | 10/1976 | Lioux | 279/4 |
| 4,184,691 | 1/1980 | Esser et al. | 279/4 |
| 4,196,914 | 4/1980 | Kutman et al. | 279/4 |
| 4,215,605 | 8/1980 | Toth et al. | 279/4 |
| 4,296,658 | 10/1981 | Champean et al. | 279/4 |

Primary Examiner—E. R. Kazenske
Assistant Examiner—Paul M. Heyrana, Sr.
Attorney, Agent, or Firm—Wenderoth, Lind & Ponack

[57] ABSTRACT

A fluid-actuated type hollow power chuck has a hollow cylindrical chuck body with a forward part of larger outer diameter and a rearward part of small outer diameter. A cylinder body of a hollow cylindrical shape is secured to and around to the outer surface of the rearward part of the chuck body so as to form an annular cylinder chamber. A piston slidable in the cylinder chamber to operate the jaws has a piston sleeve extending rearward therefrom between the chuck body and the cylinder body, the displacements of the piston sleeve being detected at points rearward of the cylinder body by proximity switches installed in a ring disposed to the rear of the cylinder body, whereby displacements of the jaws are indirectly indicated by the switches.

6 Claims, 8 Drawing Figures

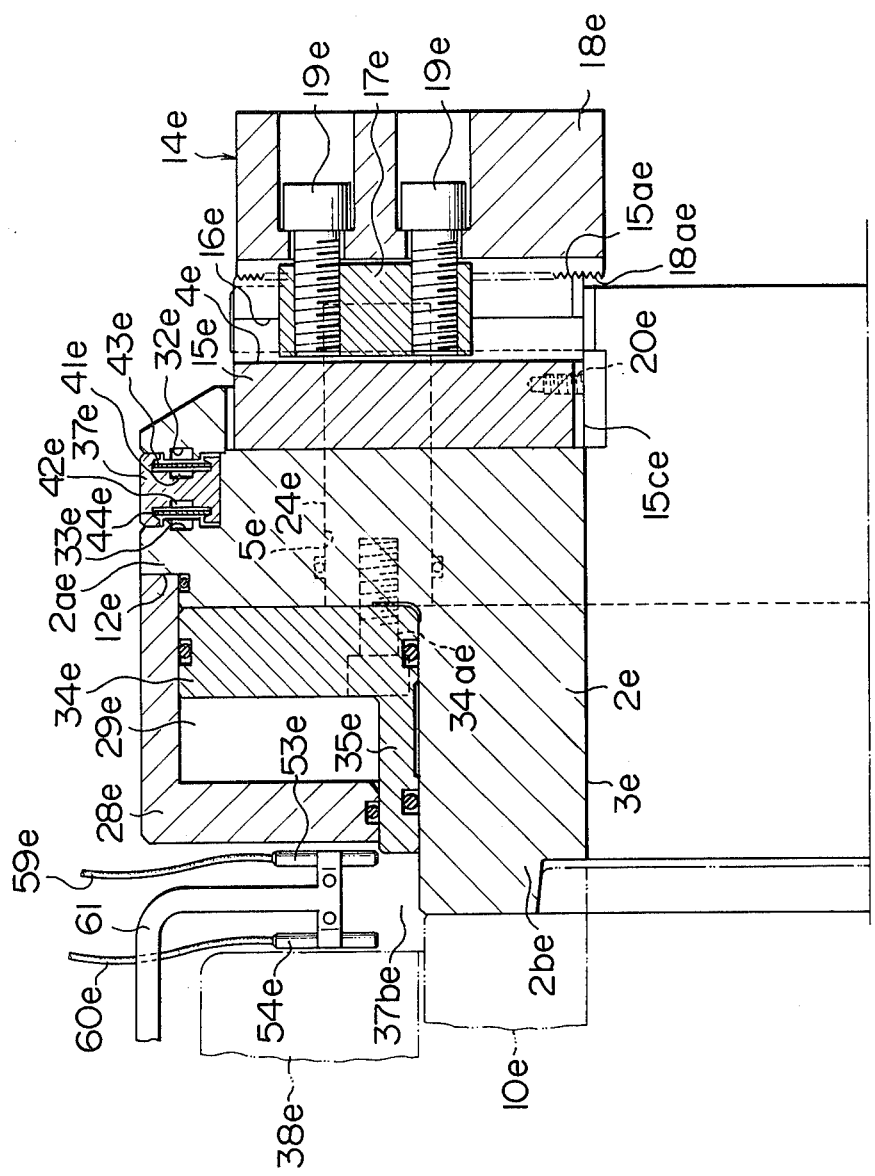

FLUID-ACTUATED HOLLOW POWER CHUCK

BACKGROUND OF THE INVENTION

This invention relates generally to machine tools having hollow spindles and hollow chucks mounted thereon. More particularly, the invention relates to a fluid-actuated type hollow power chuck in which a fluid-actuated cylinder for driving the jaws of the chuck is provided integrally with the chuck body in order to utilize with maximum effectiveness the through bore of the main spindle of a machine tool. Chucks of this character are generally called "front chucks" and are often used for machining pipes for oil drilling work and electrode rods for electric furnaces. These chucks are suitable for machining rod and tube materials of relatively large diameters.

Recently, in the field of machine tools, the use of numerical-control machine tools has become widespread. In many cases, however, in order to elevate the work reliability in such numerical-control machine tools, verification of the gripped and released states of the workpiece by electrically detecting the movement of the jaws of the chuck is required.

For this purpose, in an ordinary type of fluid-actuated chuck in which the chuck and a fluid cylinder for actuating the chuck jaws are separate, the piston rod of the piston operating in the cylinder projects rearwardly of the cylinder, which is mounted on the rear end of the machine spindle, and the position of the extremity of this piston rod is detected at a point to the rear of the cylinder by limit switches or proximity switches thereby to detect the movements of the chuck jaws.

In contrast, in a fluid-actuated hollow chuck in which the chuck and the jaw-actuating cylinder are of integral construction, from the viewpoint of the fundamental functional object of the chuck, the disposing of a tube or rod for transmitting the movements of the hollow piston to a point rearward of the machine spindle within the through bore of the spindle is not permissible. For this reason, detecting of the movements of the jaws at a point to the rear of the spindle as in the aforedescribed ordinary type chuck is not possible, whereby it has been unavoidably necessary to carry out this detecting at a point forward of the spindle.

In a known fluid-actuated hollow chuck of this kind, as shown in FIG. 5 of Japanese Patent Publication No. 34354/1978 (corresponding to U.S. Pat. No. 3,918,352), a rear cover secured to the rear face of the chuck body on the inner side of which a cylinder chamber is formed is mounted on the machine spindle, and a guiding bushing is fitted in the chuck body and a central hole of the rear cover and fixed to the chuck body, a hollow chuck piston being slidably fitted around the outer surface of this guiding bushing.

In this chuck, it may appear to be possible to provide on the rear side of the hollow piston a piston sleeve projecting rearward of the rear cover and to detect the position of this piston sleeve by means of switches. However, because of the construction of this chuck as described above, this piston sleeve must be disposed on the inner side of the attachment of the rear cover and the spindle, whereby it is practically impossible to detect movements of this piston sleeve. Another method of detection which may seem to be feasible is to embeddedly secure a plurality of pins to the hollow piston, to lead the movements of these pins outside of the chuck body, and to detect these movements. However, a system for practicing this method would be complicated and difficult to reduce to practice. Thus, in the present state of the art, a practical detection system capable of electrically detecting the movements of the chuck jaws has not yet been devised.

Furthermore, in a known fluid-actuated hollow chuck of the above description, the chuck body is secured to the machine spindle by way of a rear cover of relatively small thickness dimension, whereby the rigidity of the chuck cannot be increased in spite of the increase in weight of the entire chuck, and it has heretofore been difficult to use chucks of this character in heavy machining.

SUMMARY OF THE INVENTION

It is an object of this invention to overcome the above described difficulties accompanying the known fluid-actuated hollow chuck and to provide a fluid-actuated hollow chuck of practical character in which the movements of the chuck jaws can be electrically detected in a positive manner at a point in front of the machine spindle, and, moreover, the rigidity of the chuck body can be increased.

In the chuck of this invention, by attaching a cylinder body to the chuck body, an annular cylinder chamber is formed on the outer side of the chuck mounting part of the chuck body and accommodates an annular hollow piston slidably fitted therein and having at the rear end thereof a piston sleeve, which is slidably fitted in a space between the chuck body and the cylinder body so that it can project rearward of the cylinder body, and proximity switches for detecting positions of this piston sleeve are disposed at positions to the rear of the cylinder body.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

In the drawings:

FIG. 8 is a side view, in longitudinal section, showing one half of another embodiment of the invention.

DETAILED DESCRIPTION OF THE INVENTION

Figure 1:
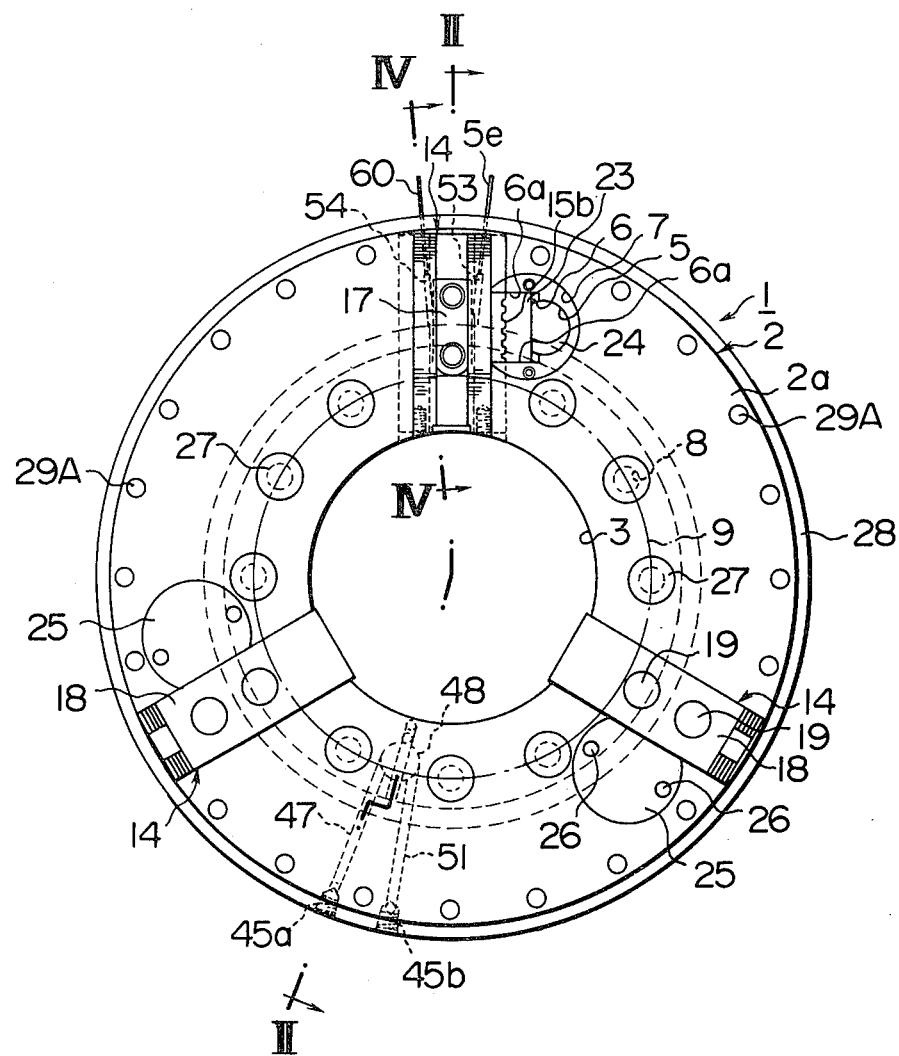
FIG. 1 is a front view, with certain parts deleted, showing a first example of the fluid-actuated hollow chuck according to this invention.

A first example of a fluid-actuated hollow chuck constituting a preferred embodiment of this invention will first be described in conjunction with FIGS. 1 through 7. This fluid-actuated hollow chuck 1 has a hollow chuck body 2 which has a central through bore 3 and, at its outer part, has a large-diameter part 2a formed at its front portion (right-hand portion as viewed in FIG. 2) and a small-diameter part 2b formed at its rear portion (left-hand portion as viewed in FIG. 2).

Figure 3:
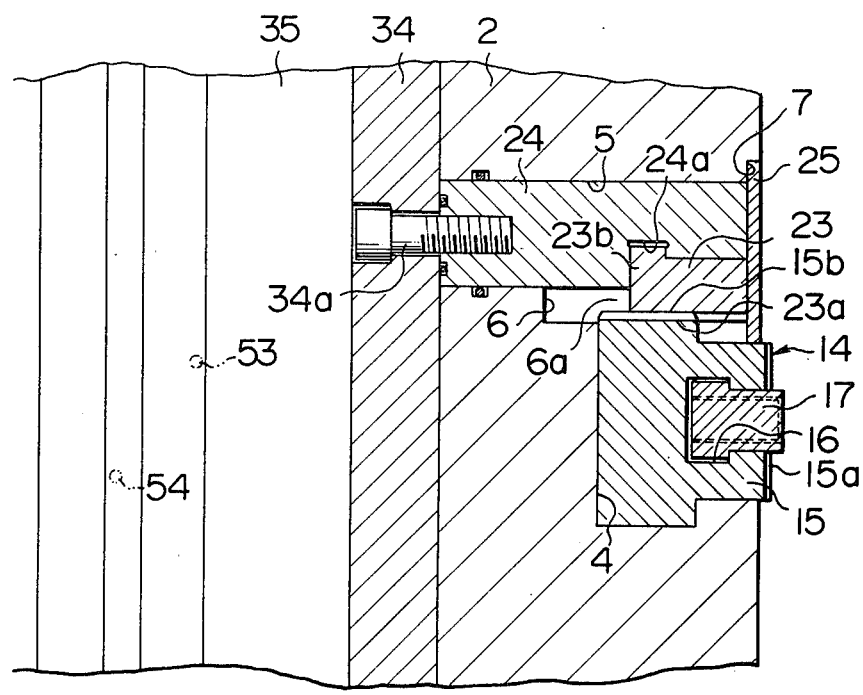
FIG. 3 is a partial enlarged section taken along the plane indicated by line III—III in FIG. 2 as viewed in the direction of the arrows.

As best shown in FIG. 3, this chuck body 2 is provided at its front face with three jaw-mounting slots 4 having Tee-shaped cross sections and formed by machining in the chuck body front face in radial directions at equal angular intervals. To one lateral side (on the side in the clockwise direction as viewed in FIG. 1) of each jaw-mounting slot 4, an insertion hole 5 is formed by machining a through hole through the large-diameter part 2a of the chuck body 2 parallel to the chuck axis. Each jaw-mounting slot 4 and the corresponding insertion hole 5 are connected by a sliding groove 6 which is parallel to the chuck axis and has parallel opposed sliding surfaces 6a formed perpendicularly relative to the side surfaces of the jaw-mounting slot 4.

The front face of the chuck body 2 is further provided with a shallow cover plate mounting recess 7 around each insertion hole 5 and the corresponding sliding groove 6. Furthermore, a plurality (nine in the instant example) of chuck-mounting bolt holes 8 are formed through the chuck body 2 parallel to its axis as through holes from the front face to the rear face of the chuck body on a common pitch circle 9 at spaced-apart positions clear of the jaw-mounting slots 4 and near the central through bore 3. The diameter of the pitch circle 9 is made equal to the pitch circle of mounting-bolt holes 11 formed in the main spindle 10 of the machine tool on which the chuck 1 is mounted. The chuck-mounting bolt holes 8 are also coaxially aligned respectively with corresponding mounting-bolt holes 11. The rear face of the large-diameter part 2a of the chuck body 2 is provided around its entire outer periphery with a stepped part 12 for fitting thereon the front end of an annular cylinder body 28 described hereinafter.

A jaw, generally designated by the reference numeral 14, is mounted in each of the above described three jaw-mounting slots 4 of the chuck body 2 and has a construction as follows. A master jaw 15 is slidably fitted in each jaw-mounting slot 4. In the front central part of each master jaw 15, a nut groove 16 of Tee-shaped cross section is formed by machining. On the front face of the master jaw 15, on both sides of the nut groove 16, meshing teeth 15a of saw-tooth section are formed. Furthermore, wedge serrations 15b, which are inclined relative to the sliding direction of the master jaw 15 with an inclination directed rearwardly and toward the outer periphery of the chuck body 2, are formed on one side face of each master jaw 15 nearest the corresponding insertion hole 5.

A jaw nut 17 is movably fitted in the nut groove 16 of each master jaw 15. Meshing teeth 18a of a top jaw 18 are meshed with the above mentioned meshing teeth 15a of each master jaw 15, and the top jaw 18 is fixed to the master jaw 15 by two tightening bolts 19 screwed into the jaw nut 17.

Figure 6:
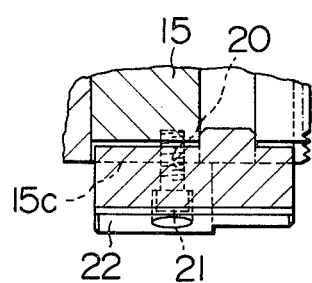
FIG. 6 is a fragmentary sectional view showing the state of mounting of an auxiliary jaw on a master jaw.
Figure 7:
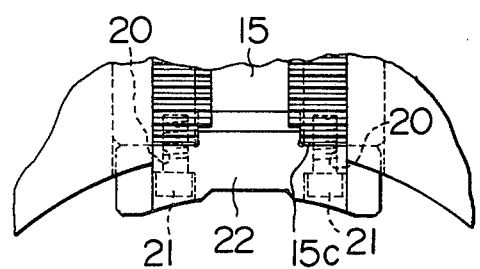
FIG. 7 is a fragmentary view of FIG. 6 as viewed from the right-hand side.

The above described master jaw 15 has inner end surfaces 15c which are exposed to the interior of the through bore 3 of the chuck body 2, and in which jaw-mounting tapped holes 20 are formed. If desired, an auxiliary jaw 22 can be mounted on the inner end surface 15c as shown in FIGS. 6 and 7 by screwing mounting bolts 21 into these tapped holes 20.

Figure 5:
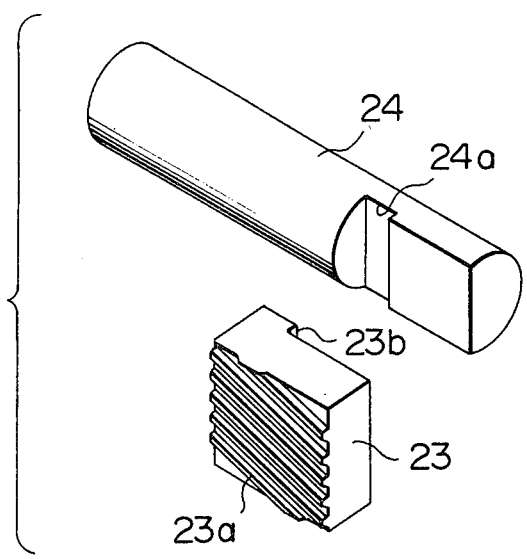
FIG. 5 is an exploded perspective view showing a draw bar and a wedge block.

A wedge block 23 as shown in FIG. 5 is fitted in a manner permitting it to slide parallel to the chuck axis in each sliding groove 6 of the chuck body 2. Each wedge block 23 has wedge serrations 23a formed on its side facing its corresponding jaw 14. These wedge serrations 23a are meshed with the aforementioned wedge serrations 15b of the master jaw 15. The wedge block 23 is further provided with an engaging projection 23b formed on its side opposite from the jaw 14. A draw bar 24 is fitted in a slidable yet gas-tight manner in each insertion hole 5 of the chuck body 2 and has a rear end coupled to a hollow piston described hereinafter. At the front end part of this draw bar 24, on one side face thereof, an engaging recess 24a is formed to receive the above described engaging projection 23b of the wedge block 23.

A cover plate 25 is fitted into each of the aforementioned cover plate mounting recesses 7, being secured in place by mounting screws 26, and serves to prevent the infiltration of swarf, chippings, and cutting oil into the sliding groove 6.

The chuck body 2 can be secured directly to the front face of the spindle 10 of the machine tool by passing chuck-mounting bolts 27 through the chuck mounting bolt holes 8 of the chuck body 2 and screwing the bolt ends into the mounting-bolt holes 11 of the spindle 10.

The annular cylinder body 28 briefly mentioned hereinbefore is mounted in a gas-tight manner by means of a large number of mounting screws 29A on the aforementioned cylinder mounting part 12 of the chuck body 2 and is thus disposed around the small-diameter part 2b of the chuck body 2. At its forward part, this cylinder body 28 has a cylinder bore 28a of relatively large inner diameter and, at its rearward part has a sleeve-sliding bore 28b of relatively small inner diameter, which is slightly greater than the outer diameter of the small-diameter chuck part 2b. An annular cylinder chamber 29 is thereby formed between the inner surface of the cylinder bore 28a and the outer surface of the small-diameter chuck part 2b, and an annular sleeve fitting clearance 30 is formed between the inner surface of the sleeve-sliding bore 28b and the outer surface of the small-diameter chuck part 2b.

Figure 4:
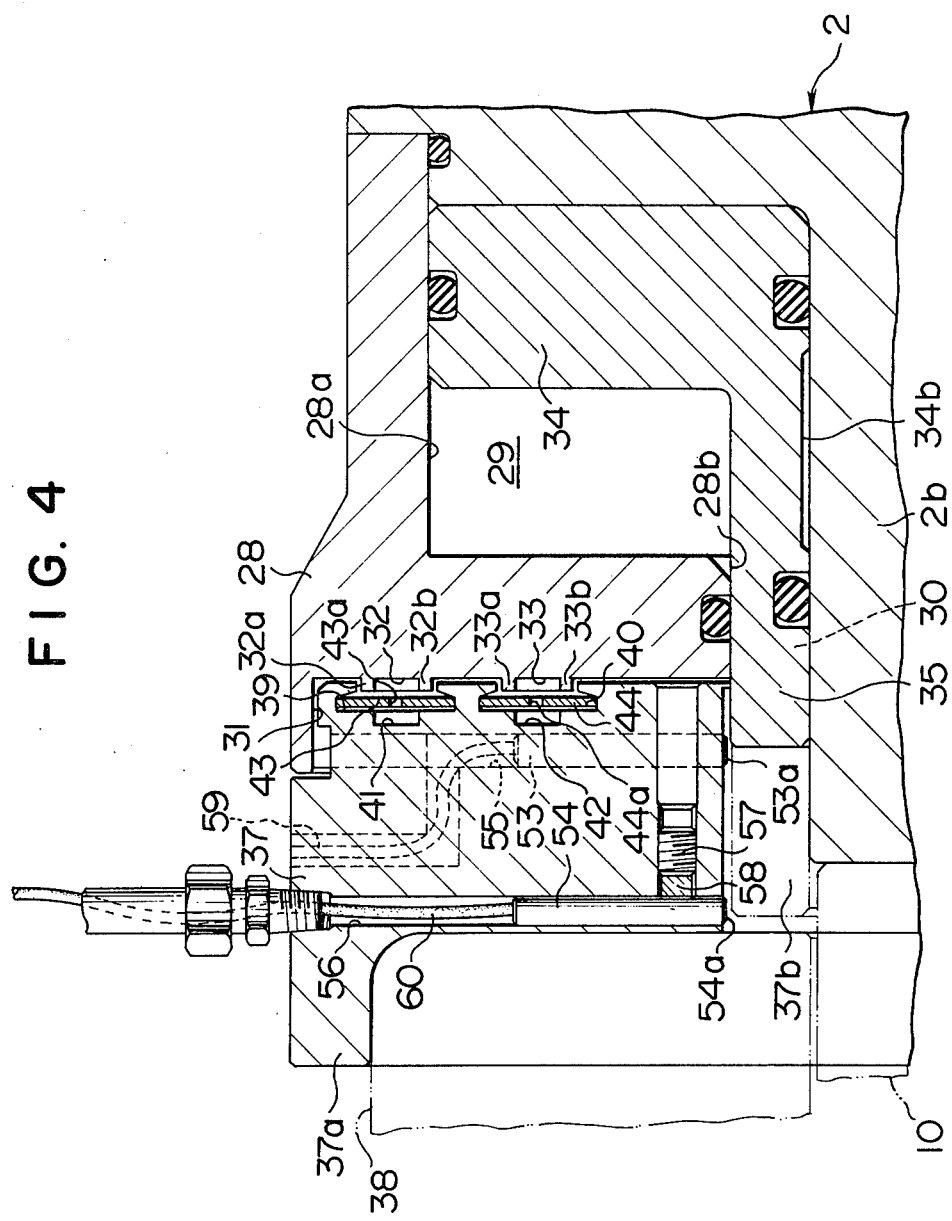
FIG. 4 is a partial enlarged section taken along the plane indicated by line IV—IV in FIG. 1 as viewed in the direction of the arrows.

At the rear end of the cylinder body 28, there is formed a recess 31 for positioning an actuation fluid supply ring 37 described hereinafter. At the rear face of the cylinder body 28, within this recess 31, two annular grooves 32 and 33 for supplying an actuation fluid are formed concentrically about the chuck body axis respectively between and by annular ridges 32a and 32b and annular ridges 33a and 33b as shown in FIG. 4.

Since the cylinder body 28 is secured to the outer side of the chuck body 2, which can be mounted directly onto the machine spindle 10, and is functionally separate from the chuck body 2, the weight of the cylinder body 28 can be reduced by fabricating it from a light alloy without reducing the rigidity of the chuck body 2. By adopting such a light construction, the moment of inertia of the chuck assembly can be greatly reduced.

Figure 2:
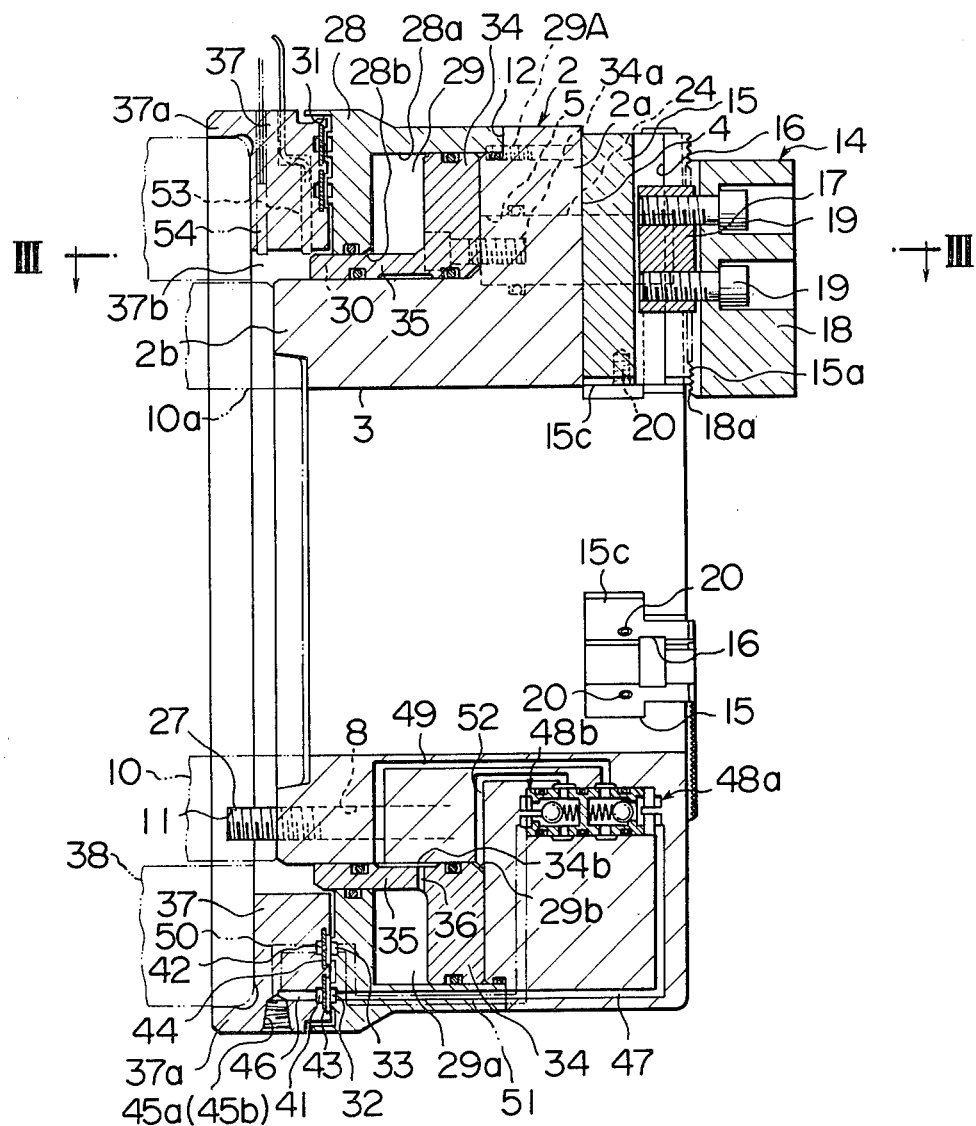
FIG. 2 is a section taken along the planes indicated by line II—II in FIG. 1 as viewed in the direction of the arrows.

An annular or hollow piston 34 is slidably fitted in the above described cylinder chamber 29 and is coupled integrally at its front end to the rear ends of the draw bars 24 by respective attachment bolts 34a. Since this piston 34 is a double-acting piston, the cylinder chamber 29 comprises a rear-side cylinder chamber 29a and a front-side cylinder chamber 29b respectively on the rear and front sides of the piston 34. A piston sleeve 35 is integrally and coaxially joined to the rear end of the piston 34. This piston sleeve 35 is fitted in a gas-tight, slidable manner in the above mentioned sleeve fitting clearance 30, and its rear extremity projects rearward beyond the rear face of the cylinder body 28 at its radially inner most part. A shallow annular cavity 34b constituting a passage for an actuation fluid is formed around the middle part of the inner wall surface of the hollow piston 34. This annular cavity 34b is communicated with the rear-side cylinder chamber 29a through a plurality of communication holes 36 formed in the piston sleeve 35 as shown in FIG. 2.

An actuation fluid supply ring 37 (hereinafter referred to as supply ring 37) is disposed to the rear of and coaxially with the cylinder body 28 and has at its rear outer periphery an annular mounting part 37a. The supply ring 37, when its front end part is positioned within the aforementioned recess 31 in the rear end of the cylinder body 28, can be fixed by this mounting part 37a to the machine stock 38 of the machine tool. Between the inner wall surface of this supply ring 37 and the outer peripheral surface of the small-diameter part 2b of the chuck body 2, there is formed a gap 37b for detection and which is of sufficient size for permitting sliding therein of the piston sleeve 35.

The supply ring 37 may also be prevented from becoming dislodged by providing a bearing support cylinder integrally at the inner rim part of the cylinder body 28 at its rear face and mounting the supply ring 37 on the cylinder body 28 by way of a bearing fitted onto the outer peripheral surface of this bearing support cylinder.

On the front face of this supply ring 37, at a part thereof confronting the aforedescribed annular ridges 32a and 32b and annular ridges 33a and 33b of the cylinder body 28, annular packing grooves 39 and 40 of Tee-shaped cross section as disclosed in Japanese Patent Publication No. 34354/1978 are formed, as shown best in FIG. 4. Furthermore, at the bottoms of these annular packing grooves 39 and 40, annular grooves 41 and 42 are formed at positions confronting the annular grooves 32 and 33. Annular packings 43 and 44 having several through holes 43a and 44a at positions confronting the annular grooves 41 and 42 are fitted in these annular packing grooves 39 and 40.

When an actuation fluid such as air, for example, is supplied into the annular grooves 41 and 42, the annular packings 43 and 44 are respectively pressed against the annular ridges 32a and 32b and the annular ridges 33a and 33b, whereby the actuation fluid can be supplied, without leakage, through the through holes 43a and 44a to the annular grooves 32 and 33.

The above mentioned supply ring 37 is provided at its outer periphery with supply ports 45a and 45b for supplying the actuation fluid. One supply port 45a is communicated with the rear-side cylinder chamber 29a through a passage 46 within the supply ring 37, the annular grooves 41 and 32, a passage 47 within the cylinder body 28 and the chuck body 2, a pilot check valve 48a, a passage 49 within the chuck body 2, the annular cavity 34b, and the communication holes 36. The other supply port 45b is communicated with the front-side cylinder chamber 29b through a passage 50 within the supply ring 37, the annular grooves 42 and 33, a passage 51 within the cylinder body 28 and the chuck body 2, a pilot check valve 48b, and a passage 52 within the chuck body 2.

The above mentioned pilot check valves 48a and 48b are so designed and constructed as to perform the functions of preventing reverse flow of the actuation fluid supplied into the front-side and rear-side cylinder chambers 29b and 29a and, at the same time, by supplying actuation fluid to one of these cylinder chambers 29b and 29a, discharging the actuation fluid from the other cylinder chamber. The operations of these pilot check valves 48a and 48b in relation to the operations of the piston 34 and of a system for detecting the position of the piston are described hereinafter. However, a detailed description of these pilot check valves 48a and 48b will not be presented here since it is fully disclosed in Japanese Patent Publication No. 35564/1980.

The position of the rear end of the piston sleeve 35 is detected by proximity switches 53 and 54. These proximity switches 53 and 54 are inserted and held in accommodating bores 55 and 56 extending through a part of the supply ring 37 in the radial direction thereof so that the detecting heads 53a and 54a of the proximity switches are exposed in the aforementioned gap 37b. Each of the proximity switches 53 and 54 is fixed in place by a clamp screw 57 and a protector member 58. These proximity switches 53 and 54 are connected by lead wires 59 and 60 to a control device (not shown) of the machine tool.

One proximity switch 53 is positioned slightly rearward from the rear end of the piston sleeve 35 in its most forwardly advanced position. When the hollow piston 34 is caused to slide to the forward end of its advance stroke, the rear end of the piston sleeve 35 departs from its position of confrontation with the detection head 53a of the proximity switch 53, which thereupon assumes an OFF state from an ON state. As a result, the fact that the piston 34 is at its forward end of its advance stroke is detected. That is, the fact that the jaws 14 are in their non-gripping opened positions is detected.

The other proximity switch 54 is positioned slightly forward from the rear end of the piston sleeve 35 in its most rearward retracted position. When the piston 34 is caused to slide to the rearmost end of its retraction stroke, the rear end of the piston sleeve 35 registers with the confrontation position of the detecting head 54a of the proximity switch 54, which thereupon assumes an ON state from an OFF state. As a result, the fact that the piston 34 is at its rearmost end of its retraction stroke is detected, which means that the jaws 14 are at the ends of their movement toward the central side and are not gripping a workpiece.

Accordingly, by determining whether the detection states of the proximity switches 53 and 54 are ON, ON, or whether they are OFF, OFF, the fact that the jaws 14 are not gripping a workpiece can be electrically detected. By utilizing the resulting detection signal, the machine tool can be placed in an inoperable state. Furthermore, by detecting that the proximity switches 53 and 54 are in their detection states of ON or OFF, the fact that the jaws 14 are gripping a workpiece can be electrically detected. By utilizing the resulting detection signal, the machine tool can be placed in an operable state.

When the above described mechanically-actuated type hollow chuck 1 is to be used in a machine tool, the supply ring 37 is first mounted on the machine stock 38, and thereafter the rear face of the chuck body 2 is placed in contact with the front face of the spindle 10. The chuck body 2 is then secured by means of the chuck-mounting bolts 27 to the spindle 10. Next, the workpiece to be machined is positioned at the central part between the three top jaws 18, which have been placed in their opened positions.

In this case, the chuck body 2 and the spindle 10 are provided through their central parts respectively with central through bores 3 and 10a. Moreover, no members whatsoever, such as for actuating the jaws 14 or for detecting the movements of the jaws 14, are disposed within these through bores 3 and 10a. Accordingly, the interiors of these through bores 3 and 10a can be effectively used to the maximum limit for the workpiece. Therefore, workpieces of relatively large diameters can be passed through the interiors of the through bores 3 and 10a.

Returning to operational procedure, actuation fluid is next supplied to the supply port 45b of the supply ring 37. This actuation fluid flows through the passage 50, enters the annular groove 42, and presses the annular packing 44 against the annular ridges 33a and 33b, thereby preventing leakage of the actuation fluid. The fluid then passes through the through hole 44a and through the passage 51 to actuate the pilot check valve 48b, flows through the passage 52 to enter the front-side cylinder chamber 29b, and thereby forces the piston 34 to slide rearward, thereby discharging the actuation fluid in the rear-side cylinder chamber 29a.

This rearward stroke of the piston 34 causes the three draw bars 24 to slide rearward and, in turn, to cause the wedge blocks 23 to slide rearward. As a consequence, the master jaws 15 are caused to slide inward along the jaw-mounting slots 4 toward the chuck centerline, whereby the top jaws 18 contact the outer peripheral surface of the workpiece and grip the same. In this case, the wedge blocks 23 are respectively caused to slide without clearance along the sliding surfaces 6a on the outer side in the radial direction of the sliding grooves 6. Therefore, the jaws 14 can be held accurately and positively at positions equidistant from the chuck centerline, whereby it is possible to maintain a high degree of machining precision.

As another consequence of the master jaws 15 being moved to respective positions where the top jaws 18 grip the workpiece as described above, the piston sleeve 35 of the piston 34 is stopped at an intermediate position which is short of the rearmost end of its stroke and after its rear end has reached the position for confronting the detecting head 53a of the proximity switch 53. At this time, the proximity switches 53 and 54 respectively assume their ON and OFF states and, by thus detecting the fact that the jaws are gripping the workpiece, cause the machine tool to assume its operable state.

However, in the case where the top jaws 18 have not gripped the workpiece for some reason such as, for example, a failure in an automatic device for feeding and exchanging workpieces, the piston sleeve 35 of the piston 34 is caused to slide rearward to the rearmost end of its stroke as indicated by the two-dot chain line in FIG. 4, where its rear end enters the position for confronting the detecting head 54a of the proximity switch 54. These proximity switches thereupon assume their ON state, thereby detecting the fact that the jaws 14 are not gripping a workpiece, and accordingly cause the machine tool to assume its inoperable state. Therefore, it is possible to obviate a wasteful operation such as carrying out the succeeding machine work with the jaws 14 in a state wherein they are not gripping a workpiece blank, thereby to elevate the reliability of the operation, which is particularly important in the case of automated operations without constant attention of operators.

In normal operation, after it has been confirmed by the signals produced by the proximity switches 53 and 54 that a workpiece is being gripped by the jaws, the supply of the actuation fluid to the supply port 45b is stopped, but since the actuation fluid supplied into the front-side cylinder chamber 29b is prevented from flowing in the reverse direction by the pilot check valve 48b, the state of gripping of the workpiece by the jaws 14 is continuously maintained even after the supplying of the fluid is stopped. Furthermore, when the supplying of the actuation fluid is stopped, the annular packing 44 reassumes its original state because of its elasticity and, separating from the annular ridges 33a and 33b, assumes its non-contacting state.

Thereafter, the spindle 10 of the machine tool is rotated to cause the fluid-actuated chuck 1 and the workpiece to rotate, in which state the machining of the workpiece is carried out. In this case, the chuck body 2 of the chuck 1 is secured directly to the spindle 10 by the chuck-mounting bolts 27. For this reason, the entire chuck 1 can be made to have great rigidity even though the chuck body 2 is provided with a cylinder, whereby the chuck action of gripping the workpiece can be made stable, and, furthermore, the chuck 1 can withstand heavy machining work.

Upon completion of the machining of the workpiece, the rotation of the spindle is stopped, after which actuation fluid is supplied to the other supply port 45a. This fluid passes through the passage 46 to enter the annular groove 41 and press the annular packing 43 against the annular ridges 32a and 32b, then flows through the through hole 43a and the passage 47 to actuate the pilot check valve 48a, thereafter passes through the passage 49, the annular cavity 34b, and the communication holes 36 to enter the rear-side cylinder chamber 29a, and thus forces the piston 34 to slide forward, thereby discharging the actuation fluid in the front-side cylinder chamber 29.

This forward movement of the piston 34 is transmitted by way of the draw bars 24 and the wedge blocks 23 to move the jaws 14 outward in their radial directions thereby to release the workpiece and return to their original opened positions. At the same time, when the jaws 14 are thus returned to their original positions, the piston sleeve 35 is moved to the foremost end of its stroke, and its rear end moves out of its position of confrontation with the detecting head 53a of the proximity switch 53. Consequently, the proximity switches 53 and 54 assume their OFF states, whereby the fact that the jaws 14 have released the workpiece is detected, and a grip-release signal is transmitted to the aforementioned control device.

However, in the case where the jaws 14 are not returned to their opened positions for some reason such as failure of the mechanism for supplying the actuation fluid, the rear end of the piston sleeve 35 is not moved forward of proximity switch 53, whereby the proximity switches 53 and 54 respectively remain in their ON and OFF states, and a detection signal indicating release of the workpiece is not generated. Thus, in accordance with the signal states of the proximity switches 53 and 54, the release of the workpiece from the gripping action of the jaws 14 can be electrically detected and verified. On the basis of this verification, trouble such as breakage or damage of machine parts due to interference or collision between the workpiece or the jaws 14 and an automatic exchanging device, for example, as a consequence of automatic exchanging of the workpiece as a succeeding process step can be prevented.

In normal operation, after verification of the opened state of the jaws 14, the supply of the actuation fluid to the supply port 45a is stopped, but the pilot check valve 48a functions to maintain the jaws 14 in opened state. Furthermore, the annular packing 43 separates from the annular ridges 32a and 32b and assumes its non-contacting state. Thus, one cycle of operation is completed.

In the above described fluid-actuated type, hollow chuck 1 of this invention, if desired, the auxiliary jaws 22 mentioned hereinbefore can be secured to the inner end surfaces of the master jaws 15 by means of mounting holes 21 as shown in FIGS. 6 and 7. By thus using these auxiliary jaws 22, the workpiece can be gripped at a position nearer the end surface of the spindle 10, whereby the gripping action can be made even more stable with greater gripping force without "floating" of the jaws.

In another embodiment of this invention as shown in FIG. 8, the actuation fluid supply ring 37e is disposed around the outer peripheral part of the large-diameter part 2ae of the chuck body 2e. Proximity switches 53e and 54e are disposed in a space formed to the rear of the cylinder body 28e and are held by a holder 61, which is fixed to the machine stock 38e. Those parts in this chuck illustrated in FIG. 8 which can be considered to be the same as or similar to corresponding parts in the preceding example illustrated in FIGS. 1 through 7 are designated by like reference numerals to which the subscript e has been appended. A detailed description of such parts will not be repeated.

It is to be noted that various modifications can be made in the hollow chuck of this invention as described above. For example, while in the above described examples the proximity switches are positioned to respectively detect the forward and rear ends of the stroke of the piston sleeve, they may be so disposed that one switch is adjustable in position in the forward-rearward direction thereby to detect the position of the piston sleeve and the forward limit of its stroke, and correct and positive verification of the gripping and releasing of the workpiece is carried out. Furthermore, the chuck body may be mounted on the spindle by means of a cam-lock stud secured to the chuck mounting part of the chuck body. Still another modification is the use of one or three or more proximity switches for detection.

By mounting two chucks respectively on the front and rear ends of the machine spindle to grip a workpiece at two spaced-apart positions thereon, stable gripping, high machining precision, and high work efficiency are attained.

According to this invention as described above, a cylinder chamber defined by a cylinder body is provided on the outer side of the pitch circle of chuck-mounting holes disposed therearound and accommodates a hollow or annular piston having a piston sleeve which projects rearward from the cylinder body, and at least one proximity switch is used to detect the position of this piston sleeve. Accordingly, when the chuck jaws are actuated to grip and release a workpiece, the movement of these jaws can be electrically detected in an accurate and positive manner at a position remotely separated from the place where machining is carried out and where cutting liquid is scattered, whereby the gripping and releasing of the workpiece by the jaws can be accurately and positively verified. Therefore, when the chuck of this invention is used in a numerically-controlled machine tool, its work reliability can be greatly improved.

Furthermore, the cylinder body is mounted on the chuck body, and the cylinder chamber is formed on the outer side of the chuck-mounting part of the chuck body. Because of this construction, in the case where the chuck is to be mounted on the spindle of the machine tool, the chuck body can be secured directly to the spindle, whereby the rigidity of the chuck can be increased, and the chuck can be used for heavy machining work. At the same time, the gripping of the workpiece by the jaws can be stabilized, whereby the machining precision is effectively improved. Moreover, since the piston sleeve of the hollow piston is made to project rearwardly through a space between the chuck body and the cylinder body, the chuck construction can be made very simple and inexpensive.

In contrast to the known chuck of the "two-piece" type having a rear cover, the chuck of this invention has a chuck body of a "one-piece" or integral construction, which has great rigidity and is therefore suitable for heavy machining.

Because the central bore of the chuck of this invention is clear, which bore is substantially equal in diameter to that of the machine spindle, the chuck can be used to grip workpieces of large diameter which may approach that of the central bore. In contrast, this is difficult in an ordinary power chuck of the wedge type or the crank type in which movements in the direction of the piston rod axis are changed into movements in the radial direction to actuate the chuck jaws.

What is claimed is:

1. A fluid actuated type hollow power chuck comprising:
    a chuck body having a central through bore therethrough of uniform diameter and adapted to be mounted on a hollow spindle of a machine tool, said chuck body having a large outer diameter front part facing away from the spindle and a small outer diameter rear part facing toward the hollow spindle, and having means extending through said front and rear parts for mounting the chuck body directly on the spindle;
    chuck jaws mounted on a radial face of the large outer diameter front part of said chuck body for radial movement thereon;
    a generally hollow cylinder body having a forward part secured to said large outer diameter front part of said chuck body and a rearward part spaced radially from said small outer diameter rear part of said chuck body, said chuck body and said cylinder body defining an annular cylinder chamber therebetween around the outer surface of said rear part of said chuck body;
    an annular piston in said annular cylinder chamber and having an axial piston sleeve integral with and extending from the rear thereof and slidably and sealingly fitted between the rearward part of said chuck body and said cylinder body and projecting rearwardly of said cylinder body;
    power transmitting means operatively connecting said piston to said jaws for operating said jaws in response to axial movement of said piston; and
    detection means provided at a position rearward of said cylinder body for detecting axial displacement of the end of said piston sleeve which is outside of said cylinder body which is indirectly indicative of radial displacement of said jaws.

2. A chuck according to claim 1 in which said chuck further has an actuation fluid supply ring disposed to the rear of said cylinder body, and in which said detection means comprises proximity switches which are installed in said actuation fluid supply ring.

3. A chuck according to claim 1 in which said power transmitting means comprises a plurality of draw bars, one for each jaw, slidably supported on said chuck body and each coupled at its rear end to said piston, a wedge block having first wedge serrations and coupled to each draw bar, and said jaws each have second wedge serrations thereon and meshed with the first wedge serrations of the corresponding wedge block, the first and second wedge serrations cooperatively functioning to convert movements of the draw bars and the piston substantially parallel to the chuck axis into corresponding radial displacements of said jaws.

4. A chuck according to claim 1 further comprising an auxiliary jaw detachably secured to each chuck jaw at the radially inner surface thereof.

5. A chuck according to claim 1 in which said forward part of said cylinder body has a large inner diameter and connected at its forward end in fluid-tight engagement to the rear of said large outer diameter front part of said chuck body, and said rearward part of said cylinder body extends inwardly from the rear end of said forward part, said cylinder chamber being defined between the rear surface of the large outer diameter front part of the chuck body, the outer surface of the small outer diameter rear part of the chuck body, the front surface of the rearward part of said cylinder body, and the inner surface of said forward part of said cylinder body.

6. A chuck according to claim 1 further comprising an actuation fluid supplying system including a pressurized fluid source and pilot check valves, said system being connected to said chuck for supplying the actuation fluid into, and discharging the fluid from, the cylinder chamber on opposite sides of said piston.

* * * * *